United States Patent
Shimoda et al.

(10) Patent No.: US 9,124,212 B2
(45) Date of Patent: Sep. 1, 2015

(54) LOAD CHARACTERISTIC ESTIMATING APPARATUS FOR DRIVING MACHINE

(75) Inventors: Kenji Shimoda, Tokyo (JP); Hidetoshi Ikeda, Tokyo (JP); Hiroyuki Sekiguchi, Tokyo (JP); Takashi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 14/115,662

(22) PCT Filed: Mar. 27, 2012

(86) PCT No.: PCT/JP2012/057988
§ 371 (c)(1),
(2), (4) Date: Nov. 5, 2013

(87) PCT Pub. No.: WO2012/165011
PCT Pub. Date: Dec. 6, 2012

(65) Prior Publication Data
US 2014/0197770 A1    Jul. 17, 2014

(30) Foreign Application Priority Data

May 31, 2011   (JP) .................................. 2011-122171

(51) Int. Cl.
*H02P 1/00*  (2006.01)
*H02P 7/00*  (2006.01)
(Continued)

(52) U.S. Cl.
CPC ................ *H02P 31/00* (2013.01); *G05B 19/19* (2013.01); *H02P 23/14* (2013.01); *H02P 2205/05* (2013.01)

(58) Field of Classification Search
CPC ...... H02P 31/00; H02P 23/14; H02P 2205/05
USPC .................. 318/139, 432, 490, 561, 609, 610
See application file for complete search history.

(56) References Cited

U.S. PATENT DOCUMENTS 4,383,208 A * 5/1983 Nielson ......................... 318/618
4,749,923 A * 6/1988 Chieng .......................... 318/269
(Continued)

FOREIGN PATENT DOCUMENTS

JP    08 130893    5/1996
JP    96 37039     11/1996
(Continued)

OTHER PUBLICATIONS

Office Action issued Oct. 6, 2014 in Taiwanese Patent Application No. 101112744 (with a partial English language translation).
(Continued)

*Primary Examiner* — Eduardo Colon Santana
*Assistant Examiner* — Gabriel Agared
(74) *Attorney, Agent, or Firm* — Oblon, McClelland, Maier & Neustadt, L.L.P.

(57) ABSTRACT

A load characteristic estimating apparatus for a driving machine includes an action-command generating unit for generating an action command for a position and speed of a driving machine, a driving-force-command generating unit for generating a driving force command to cause an action of the driving machine to follow the action command, a driving unit for generating driving force corresponding to the driving force command and drive the driving machine, a sign determining unit for determining, based on driving speed of the driving machine, the state of the driving machine, a load-driving-force estimating unit for calculating, based on the driving force command, a load driving force signal, and a normal reverse-rotation-average calculating unit and a reverse-rotation-average calculating unit, configured to calculate a sequential average of the load driving force signal, respectively when the determination result is a normal and reverse rotation action.

13 Claims, 7 Drawing Sheets

(51) Int. Cl.
*G05B 13/00* (2006.01)
*G05B 11/36* (2006.01)
*G05B 11/42* (2006.01)
*H02P 31/00* (2006.01)
*H02P 23/14* (2006.01)
*G05B 19/19* (2006.01)

(56) References Cited

U.S. PATENT DOCUMENTS

| | | | | |
|---|---|---|---|---|
| 5,134,354 A | * | 7/1992 | Yamamoto et al. | 318/609 |
| 5,644,200 A | * | 7/1997 | Yang | 318/139 |
| 2007/0007920 A1 | * | 1/2007 | Tsuruta et al. | 318/432 |
| 2011/0127934 A1 | * | 6/2011 | Suzuki | 318/400.02 |
| 2011/0224876 A1 | * | 9/2011 | Paholics et al. | 701/42 |

FOREIGN PATENT DOCUMENTS

| | | |
|---|---|---|
| JP | 11 046489 | 2/1999 |
| JP | 2001 105358 | 4/2001 |
| JP | 3637597 | 1/2005 |
| JP | 2007 129789 | 5/2007 |
| JP | 2009 068950 | 4/2009 |
| JP | 2010 022138 | 1/2010 |

OTHER PUBLICATIONS

International Search Report Issued Jun. 19, 2012 in PCT/JP12/57988 Filed Mar. 27, 2012.

* cited by examiner

LOAD CHARACTERISTIC ESTIMATING APPARATUS FOR DRIVING MACHINE

FIELD

The present invention relates to a load characteristic estimating apparatus for a driving machine that performs, for a driving machine, in which a driving device such as a motor is used, such as a machine tool or a robot, estimation of a characteristic of a load such as friction.

BACKGROUND

In a driving machine, in which a driving device such as a servomotor is used, in a machine tool or a robot, for a diagnosis of a machine system concerning aged deterioration and a failure and a grasp of a characteristic change, it is conceivable to estimate and use a load characteristic such as friction of the driving machine.

One of related arts for performing a grasp of characteristic fluctuation of a machine system is explained (see Patent Literature 1). In the related art, a speed trapezoidal wave command is created in advance for an action of a driving machine, a motor is caused to operate based on the speed command, and motor speed and a torque command at the time of maximum motor speed (i.e., at the time of constant speed) for the command are stored. After the motor speed and the torque command are stored using a plurality of speed trapezoidal waves having different maximum speeds, the motor speed and the torque command are displayed on a monitor. A coefficient of viscosity and static friction of the driving machine are identified using a stored plurality of motor speeds $\omega$ and a stored plurality of torque commands Tr and used as indexes representing characteristics of the machine system.

The related art indicates a method of periodically storing, one week and one month after initial operation, data of the motor speeds $\omega$ and the torque commands Tr measured using the speed trapezoidal waves having the different maximum motor speeds and the coefficient of viscosity and the static friction estimated from the data, and comparing values of the coefficient of viscosity and the static friction and values designated by a manufacturer to grasp fluctuation in characteristics of the driving machine and determining whether the characteristics are normal or abnormal.

One of related arts for sequentially estimating friction of a driving machine is explained (see Patent Literature 2). In the related art, an estimating apparatus includes a disturbance observer unit configured to receive a torque command Tr and motor speed $\omega$ of the driving machine and output a disturbance estimated value Td^ that is an estimated value of disturbance torque Td (in this application, equivalent to load torque), which is torque applied to a motor from the outside, a disturbance-torque estimating unit configured to receive the disturbance estimated value Td^ and the motor speed $\omega$ and calculate a coefficient of viscosity D and a constant term C of a disturbance torque model Tdm obtained when the disturbance torque Td is approximated by a speed-dependent linear expression model as indicated by Formula (1), and an inertia identifying unit configured to receive an output of the disturbance-torque estimating unit, the torque command Tr, and the motor speed $\omega$ and identify inertia Jn.

$$T_{dm} = D \cdot \omega + C \begin{cases} D = D_p & C = C_p (\omega \geq 0) \\ D = D_n & C = C_n (\omega \leq 0) \end{cases} \quad (1)$$

The disturbance observer unit removes, based on the inertia identified value Jn identified by the inertia identifying unit and motor acceleration "a", which is a time difference value of the motor speed $\omega$, a torque component required for acceleration and deceleration of inertia from a torque command and outputs the disturbance estimated value Td^, which is an estimated value of disturbance applied to the driving machine, such as friction and a weight load. If there is an error between an actual value J of the inertia and the inertia estimated value Jn, the disturbance estimated value Td^ is represented by Formula (2) shown below and has inertia error disturbance in a second term. When the driving machine is not a simple rigid body, an error also occurs in Td^.

$$Td\hat{} = Td + (J - Jn) \cdot a \quad (2)$$

The disturbance-torque estimating unit applies an adaptive identification rule to the disturbance torque model Tdm obtained by approximating the disturbance torque Td with the speed-dependent linear expression as indicated by Formula (1) and sequentially calculates and estimates each of a coefficient of viscosity Dp and a constant term Cp obtained when the motor speed $\omega$ is positive and a coefficient of viscosity Dn and a constant term Cn obtained when the motor speed is negative. The constant term C is obtained by combining a torque component by a stationary gravity load and a torque component by Coulomb's friction that depends on an operating direction of the motor.

The estimating apparatus that estimates a viscosity term and a constant term according to the procedure explained above has already been proposed. Concerning the speed of the estimation in the related art, because the estimation of a characteristic of a change in a disturbance with respect to a change in the motor speed $\omega$ is performed, the estimation is normally performed at speed corresponding to a speed change of the motor, that is, a time constant equivalent to or shorter than a time constant of acceleration and deceleration. If there is an error in the inertia estimated value Jn, an error occurs in the disturbance estimated value Td^ as explained above. Therefore, an error also occurs in an estimation result of the disturbance torque command model Tdm represented by the viscosity term D and the constant term C. To cope with such a problem, in the related art, because an error of the disturbance estimated value Td^ is larger as the acceleration "a" is larger according to Formula (2), there is also proposed improvement for executing, only when the acceleration "a" is smaller than a predetermined threshold, the estimation of the viscosity term D and the constant term C of the disturbance torque model Tdm to reduce an estimation error.

CITATION LIST

Patent Literature

Patent Literature 1: Japanese Patent Application Laid-open No. 2009-68950

Patent Literature 2: Japanese Patent Application Laid-open No. 2007-129789

SUMMARY

Technical Problem

However, in the related art described in Patent Literature 1, friction of the driving machine is estimated by offline processing performed using information concerning maximum speeds of a plurality of speed trapezoidal waves of the driving machine, that is, motor speeds and torque commands in a plurality of different constant speed states of the driving machine and is used for a grasp of a characteristic change of the machine system. However, it is necessary to stop the machine once and cause the machine to perform a plurality of predetermined actions. Therefore, there is a problem in that labor and time for causing the driving machine to perform an exclusive operation action are required and applications of use are limited.

In the related art described in Patent Literature 2, a load characteristic of friction or the like in the driving machine is sequentially calculated as a coefficient of viscosity of a viscosity term proportional to speed and a constant term depending on only a sign of the speed. However, when it is considered that the related art is used for a grasp of a characteristic change of the machine system such as aged deterioration and a failure of the driving machine, there are several problems as explained below.

In the related art, a relation between a speed change and friction is sequentially estimated using a disturbance estimated value calculated based on a torque command and motor acceleration of the motor and an inertia estimated value of the machine system. Therefore, there is a problem in that an estimation error increases, in particular, during a high acceleration action and stable estimation is difficult because of an error of the inertia estimated value or, when the driving machine is not a rigid body and the rigidity of the driving machine is low, a modeling error of the driving machine. To avoid this problem, an improved method for executing estimation only in the case of acceleration equal to or lower than a threshold to reduce the estimation error is also described in Patent Literature 2. However, in that case, satisfactory estimation cannot be performed unless the threshold is appropriately set according to an operation condition of the driving machine. Therefore, there is a problem in that it is difficult to stably estimate a load characteristic peculiar to the machine system such as friction according to various operation conditions.

In the related art, a load characteristic of the driving machine is approximated by the speed-dependent linear expression model and a coefficient of viscosity and a constant term are calculated using the adaptive identification rule. However, there is an error between an actual load characteristic and a model approximated by the speed-dependent linear expression. In particular, during low-speed operation, accuracy of the approximation by the linear expression model is deteriorated and the error increases. As a result, an estimation result of the load characteristic changes according to a change such as the level of speed or under an operation condition in which low-speed operation and high-speed operation are mixed. In this way, in the related art, there is a contradiction that, although the machine is the same, an estimated load characteristic changes according to an operation condition. An estimation result of friction, which should originally be a load characteristic peculiar to the machine system, fluctuates together with the operation condition. It is difficult to stably estimate the friction such that fluctuation with time of the friction can be grasped. Therefore, there is a problem in that the related art cannot be used for applications such as diagnosis of the machine system and a grasp of a characteristic change.

The present invention has been devised in view of the problems and it is an object of the present invention to provide a load characteristic estimating apparatus for a driving machine usable for a wide range of applications that stably quantifies and estimates, in a driving machine in which a motor or the like is used, while coping with various operation conditions such as the level of speed and the length of an acceleration and deceleration time and changes under the operation conditions, a load characteristic peculiar to a machine system such as friction of a driving machine to enable a grasp of fluctuation with time of the load characteristic and can be used for diagnosis of the driving machine and a grasp of a characteristic change.

Solution to Problem

In order to solve the afore-mentioned problems and achieve the object, a load characteristic estimating apparatus for a driving machine according to one aspect of the present invention is configured to include: an action-command generating unit configured to generate an action command including a command for an action for a position of the driving machine and a command for an action for speed of the driving machine; a driving-force-command generating unit configured to generate a driving force command to cause an action of the driving machine to follow the action command; a driving unit configured to generate driving force corresponding to the driving force command and drive the driving machine; a sign determining unit configured to determine, based on driving speed of the driving machine, in which state among a normal rotation action state, a reverse rotation action state, and a stop state the driving machine is; a load-driving-force estimating unit configured to calculate, based on the driving force command or a signal representing the driving force, a load driving force signal, which is an estimated value of load driving force applied to the driving machine; a normal-rotation-load calculating unit configured to calculate a sequential average of the load driving force signal when a result of the determination of the sign determining unit is the normal rotation action state; and a reverse-rotation-load calculating unit configured to calculate a sequential average of the load driving force signal when the result of the determination of the sign determining unit is the reverse rotation action state.

Advantageous Effects of Invention

With the load characteristic estimating apparatus for the driving machine according to the present invention, there is an effect that it is possible to stably estimate characteristic of a load applied to the driving machine in a normal operation action without causing the driving machine to perform an exclusive action. The result of the estimation can be applied to a wide range of applications such as diagnosis of the driving machine and a grasp of a characteristic change.

DESCRIPTION OF EMBODIMENTS

Embodiments of a load characteristic estimating apparatus for a driving machine according to the preset invention are explained in detail below based on the drawings. The present invention is not limited by the embodiments.

First Embodiment

Figure 1:
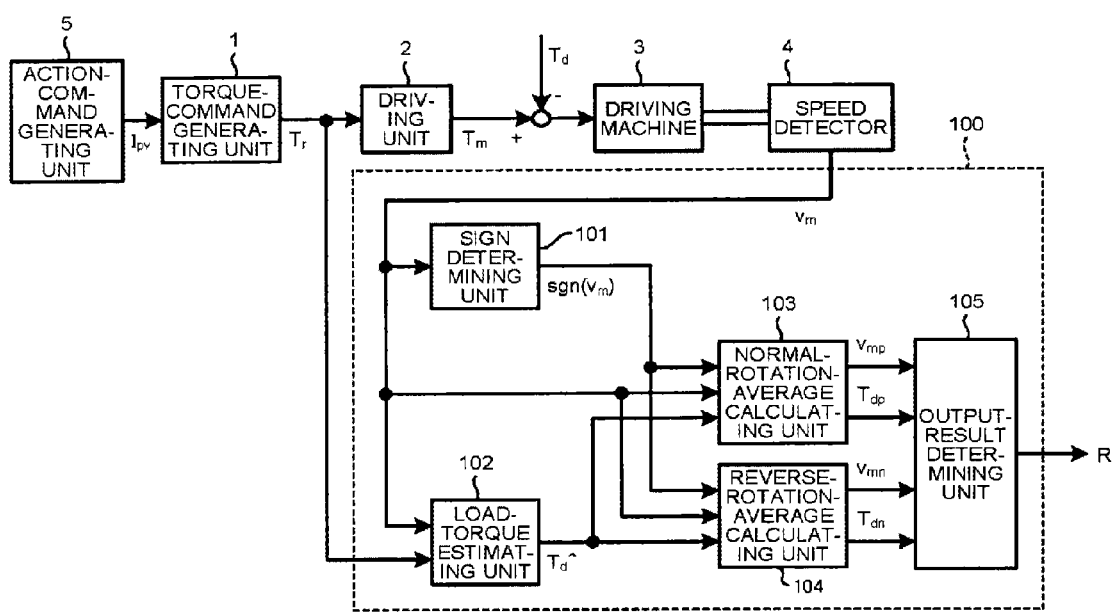
FIG. 1 is a block diagram of the configuration of a load characteristic estimating apparatus for a driving machine according to a first embodiment of the present invention.

FIG. 1 is a block diagram of the configuration of a load characteristic estimating apparatus 100 for a driving machine according to a first embodiment of the present invention.

In FIG. 1, an action-command generating unit 5 generates an action command Ipv for the position and the speed of a driving machine 3 such as a machine tool or a robot. The action command Ipv includes a command of an action for the position of the driving machine 3, a command of an action for the speed of the driving machine 3, or a command of an action for the position and the speed of the driving machine 3. A torque-command generating unit 1 (a driving-force-command generating unit) generates a torque command Tr (a driving force command) for causing the driving machine 3 to follow the action command Ipv.

A driving unit 2 is configured by a driving device such as a motor and generates driving torque Tm (driving force) corresponding to the torque command Tr to drive the driving machine 3. The speed detector 4 detects and outputs the driving speed vm of the driving machine 3. Concerning the driving speed vm, in the first embodiment, the speed of the driving machine 3 is detected and used. However, the driving speed vm only has to be a signal indicating the speed of the driving machine 3 configured by a motor or the like. For example, rotating speed of the driving unit 2 can be directly detected and used.

The load characteristic estimating apparatus 100 has a configuration including a sign determining unit 101, a load-torque estimating unit 102 (a load-driving-force estimating unit), a normal-rotation-average calculating unit 103, a reverse-rotation-average calculating unit 104, and an output-result determining unit 105. The driving speed vm and the torque command Tr are input to the load characteristic estimating apparatus 100. The load characteristic estimating apparatus 100 outputs a diagnosis result R obtained by determining whether an operation state of the driving machine 3 is normal or abnormal as explained below.

The components of the load characteristic estimating apparatus 100 are explained.

The sign determining unit 101 receives the driving speed vm as an input, determines in which action state among a normal rotation action state, a reverse rotation action state, and a stop state the driving machine 3 is, and outputs a sign determination signal sgn(vm) including action information indicating in which state among the three action states the driving machine 3 is. For example, as an output value of sgn(vm), a numerical value 1 is allocated to the normal rotation action state, a numerical value −1 is allocated to the reverse rotation action state, and a numerical value 0 is allocated to the stop state.

The load-torque estimating unit 102 receives the torque command Tr and the driving speed vm as an input and outputs a load torque signal (a load driving force signal) Td^ that is an estimated value of load torque Td, which is torque equivalent to a load such as friction applied to the driving machine 3 from the outside. As indicated by Formula (3) shown below, the load-torque estimating unit 102 outputs, as the load torque signal Td^, a torque component obtained by removing a torque component required for an acceleration and deceleration action from the torque command Tr.

$$Td\hat{} = Tr - Jn \cdot s \cdot vm \quad (3)$$

In the formula, Jn represents an inertia estimated value of the driving machine 3, s represents a Laplacian operator, and s·vm represents driving acceleration obtained by differentiating the driving speed vm with the Laplacian operator. Concerning the inertia estimated value Jn, an inertia estimated value estimated by a method of least squares or the like beforehand before the load characteristic estimating apparatus 100 according to this embodiment operates or an inertia estimated value sequentially estimated in parallel to the operation in this embodiment only has to be used. The torque command Tr input to the load-torque estimating unit 102 only has to be a signal corresponding to the driving torque Tm and can be substituted by a signal such as a detection value of the driving torque Tm or a motor current in the driving unit 2.

The normal-rotation-average calculating unit 103 outputs, based on the sign determination signal sgn(vm), the driving speed vm, and the load torque Td^, a normal rotation speed average vmp, which is a result obtained by applying a sequential averaging calculation to the driving speed vm in a time section in which the driving machine 3 is normally rotating (a normal rotation action section), and a normal rotation load estimated value Tdp, which is a result obtained by applying the sequential averaging calculation to the load torque signal Td^ in the normal rotation action section. The calculation is explained below.

The reverse-rotation-average calculating unit 104 outputs, based on the sign determination signal sgn(vm), the driving speed vm, and the load torque Td^, a reverse rotation speed average vmn, which is a result obtained by applying a sequential averaging calculation to the driving speed vm in a time section in which the driving machine 3 is reversely rotating (a reverse rotation action section), and a reverse rotation load estimated value Tdn, which is a result obtained by applying the sequential averaging calculation to the load torque signal Td^ in the reverse rotation action section. The calculation is explained below.

The normal rotation speed average vmp and the normal rotation load estimated value Tdp, which are the outputs of the normal-rotation-average calculating unit 103, and the reverse rotation speed average vmn and the reverse rotation load estimated value Tdn, which are the outputs of the reverse-rotation-average calculating unit 104, are input to the output-result determining unit 105. The output-result determining unit 105 determines an abnormality and deterioration of the driving machine 3 from these inputs and outputs a diagnosis result signal R of the determination.

The calculations by the normal-rotation-average calculating unit 103 and the reverse-rotation-average calculating unit 104 are explained with reference to FIGS. 2 and 3.

Figure 2:
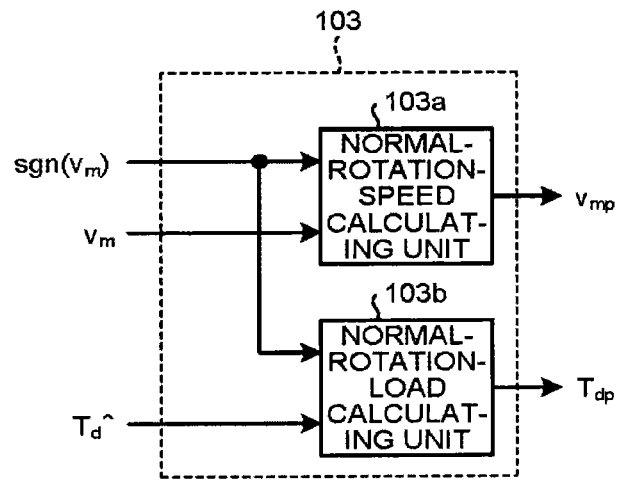
FIG. 2 is a block diagram of the configuration of a normal-rotation-average calculating unit shown in FIG. 1.

FIG. 2 is a diagram of the configuration of the normal-rotation-average calculating unit 103. In the figure, the sign determination signal sgn(vm) and the driving speed vm are input to a normal-rotation-speed calculating unit 103a. The normal-rotation-speed calculating unit 103a performs, using an averaging filter F(s) in which an averaging time constant T, which is a sufficiently long time constant, is set in, for example, a transfer function indicated by Formula (4) shown below, a calculation for sequentially averaging the driving speed vm in a normal rotation action section of the driving machine 3 determined based on the sign determination signal sgn(vm) and outputs a result of the calculation as the normal rotation speed average vmp.

$$F(s)=1/(T \cdot s+1) \tag{4}$$

The normal-rotation-speed calculating unit 103a stops the processing and retains the value of the normal rotation speed average vmp in other time sections. The average time constant T is set to a sufficiently large value such as ten times or twenty times of time required by the driving machine 3 to perform an action from the start to the stop once (an action time).

The sign determination signal sgn(vm) and the load torque signal Td^ are input to a normal-rotation-load calculating unit 103b. The normal-rotation-load calculating unit 103b performs, using the averaging filter F(s) represented by Formula (4) having a characteristic same as the characteristic of the Formula (4) in the normal-rotation-speed calculating unit 103a, a calculation for sequentially averaging the load torque signal Td^ in the normal rotation action section of the driving machine 3 determined based on the sign determination signal sgn(vm) and outputs a result of the calculation as the normal rotation load estimated value Tdp. The normal-rotation-load calculating unit 103b stops the processing and retains the value of the normal rotation load estimated value Tdp in the other time sections.

Figure 3:
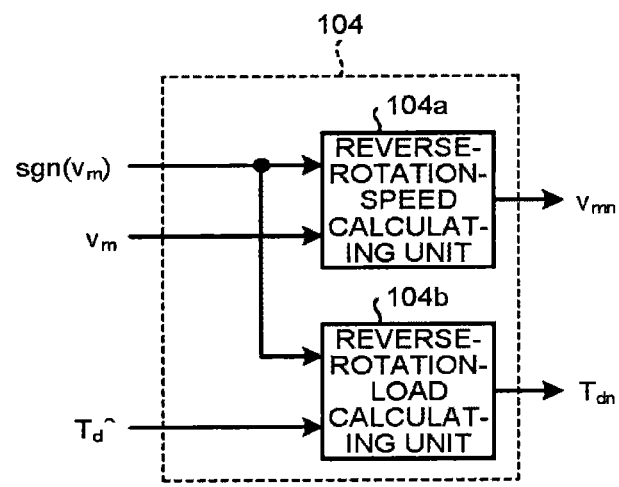
FIG. 3 is a block diagram of the configuration of a reverse-rotation-average calculating unit shown in FIG. 1.

FIG. 3 is a diagram of the configuration of the reverse-rotation-average calculating unit 104. In the figure, the sign determination signal sgn(vm) and the driving speed vm are input to a reverse-rotation-speed calculating unit 104a. The reverse-rotation-speed calculating unit 104a performs, using the averaging filter F(s) same as the averaging filter F(s) used in the normal-rotation-average calculating unit 103, a calculation for sequentially averaging the driving speed vm in a reverse rotation action section of the driving machine 3 determined based on the sign determination signal sgn(vm) and outputs a result of the calculation as the reverse rotation speed average vmn. The reverse-rotation-speed calculating unit 104a stops the processing and retains the value of the reverse rotation speed average vmn in other time sections.

The sign determination signal sgn(vm) and the load torque signal Td^ are input to a reverse-rotation-load calculating unit 104b. The reverse-rotation-load calculating unit 104b performs, using the averaging filter F(s) having a characteristic same as the characteristic of the Formula (4) in the reverse-rotation-speed calculating unit 104a, a calculation for sequentially averaging the load torque signal Td^ in the reverse rotation action section of the driving machine 3 determined based on the sign determination signal sgn(vm) and outputs a result of the calculation as the reverse rotation load estimated value Tdn. The reverse-rotation-load calculating unit 104b stops the processing and retains the value of the reverse rotation load estimated value Tdn in the other time sections.

A load characteristic peculiar to the driving machine 3 can be stably estimated as a set of values of average speed and load torque based on the output results of the normal-rotation-average calculating unit 103 and the reverse-rotation-average calculating unit 104. This is explained with reference to FIGS. 4 to 8.

Figure 4:
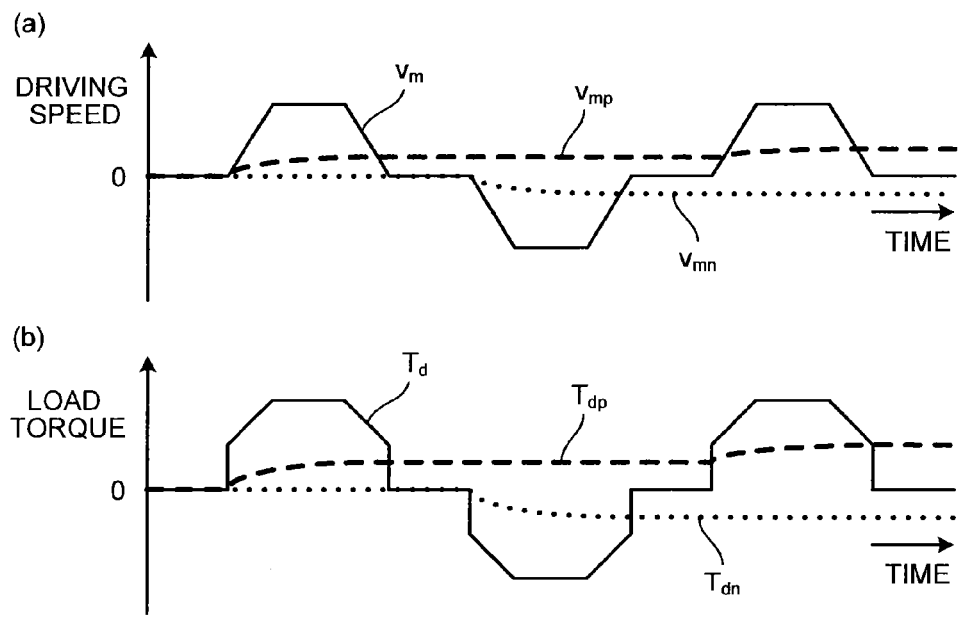
FIG. 4 is a diagram of a waveform indicating a relation between driving speed vm and a temporal change of load torque Td.

FIG. 4 is a diagram of a time response waveform obtained by causing the driving machine 3 to perform a certain predetermined action while appropriately controlling the position and the speed of the driving machine 3. In FIG. 4(a), a solid line indicates a waveform of the driving speed vm of the driving machine 3, a broken line indicates a waveform of the normal rotation speed average vmp, which is the output of the normal-rotation-speed calculating unit 103a, and a dotted line indicates a waveform the reverse rotation speed average vmn, which is the output of the reverse-rotation-speed calculating unit 104a. In FIG. 4(b), a solid line indicates a waveform of the load torque Td of the driving machine 3, a broken line indicates a waveform of the normal rotation load estimated value Tdp, which is the output of the normal-rotation-load calculating unit 103b, and a dotted line indicates a waveform of the reverse rotation load estimated value Tdn, which is the output of the reverse-rotation-load calculating unit 104b. For simplification of explanation, the load torque Td is displayed to be approximated to a characteristic of a linear expression model.

As indicated by the solid line in FIG. 4(b), when the load torque Td is approximated by a speed-dependent linear expression model, the load torque Td can be represented by Formula (5) shown below. In the formula, D represents a coefficient of viscosity proportional to speed, C represents a Coulomb's friction depending on an acting direction, and g represents a gravity load due to the gravity applied to the driving machine 3.

$$Td = D \cdot vn + C \cdot sgn(vm) + g \tag{5}$$

The load torque Td shown in Formula (5) is represented by Formula (5a) or (5b) shown below according to a sign of the driving speed vm of the driving machine 3.

$$Td = Dp \cdot vm + Cp(vm>0) \tag{5a}$$

$$Td = Dn \cdot vm + Cn(vm<0) \tag{5b}$$

In the formula, Dp and Cp respectively represent a coefficient of viscosity and a constant term obtained when the sign of the driving speed vm is plus and Dn and Cn respectively represent a coefficient of viscosity and a constant term obtained when the sign of the driving speed vm is minus. The constant terms Cp and Cn respectively indicate a sum of Coulomb's friction and a gravity load obtained when the sign of the driving speed is plus and a sum of Coulomb's friction and a gravity load obtained when the sign of the driving speed is minus. The constant terms Cp and Cn together represent a load characteristic peculiar to the driving machine 3. In the following explanation, in some case, the load characteristic is referred to as friction characteristic.

Concerning the load torque signal Td^ input to the normal-rotation-load calculating unit 103b and the reverse-rotation-load calculating unit 104b, for simplification of the following explanation, it is assumed that the load torque signal Td^ and the load torque Td of the driving machine 3 coincide with each other. Then, the normal rotation load estimated value Tdp, which is the output of the normal-rotation-load calculating unit 103b, and the reverse rotation load estimated value Tdn, which is the output of the reverse-rotation-load calculating unit 104b, are represented by Formulas (6a) and (6b) shown below by causing the averaging filter F(s) to act on Formulas (5a) and (5b).

$$Tdp = F(s) \cdot Dp \cdot vm + F(s) \cdot Cp(vm>0) \tag{6a}$$

$$Tdn = F(s) \cdot Dn \cdot vm + F(s) \cdot Cn(vm<0) \tag{6b}$$

The normal rotation speed average vmp, which is the output of the normal-rotation-speed calculating unit 103a, and the reverse rotation speed average vmn, which is the output of the reverse-rotation-speed calculating unit 104*a*, are represented by Formulas (7a) and (7b) shown below.

$$vmp = F(s) \cdot vm(vm > 0) \tag{7a}$$

$$vmn = F(s) \cdot vm(vm < 0) \tag{7b}$$

The broken line and the dotted line in FIG. 4(*b*) indicate calculation waveforms of Formulas (6a) and (6b). The broken line and the dotted line in FIG. 4(*a*) indicate calculation waveforms of Formulas (7a) and (7b).

In Formulas (6a) and (6b), Dp and Dn of right side first terms are proportionality coefficients with respect to the driving speed vm and the constant terms Cp and Cn of a second term are fixed values. In addition, as explained above, the normal-rotation-speed calculating unit 103*a* and the normal-rotation-load calculating unit 103*b* have the same averaging filter F(s) and the reverse-rotation-speed calculating unit 104*a* and the reverse-rotation-load calculating unit 104*b* have the same averaging filter F(s). Consequently, relations of Formulas (8a) and (8b) shown below hold among the normal rotation load estimated value Tdp, the reverse rotation load estimated value Tdn, the normal rotation speed average vmp, and the reverse rotation average vmn.

$$Tdp = Dp \cdot vmp + Cp(vm > 0) \tag{8a}$$

$$Tdn = Dn \cdot vmn + Cn(vm < 0) \tag{8b}$$

That is, according to the action obtained by performing all the calculations of the driving speed vm and the load torque signal Td^ using the same averaging filter F(s), when the driving machine 3 acts at the driving speed vm, an average of the load torque signal Td^ of the driving machine 3 can be represented by a linear expression in which an average of the driving speed vm of the driving machine 3 is used, and it is made possible to derive a relation same as the relation of the friction characteristic of the driving machine 3 represented by Formulas (5a) and (5b).

When the rigidity of the driving machine 3 is low, a vibration component due to a modeling error of the driving machine 3 is superimposed on the load torque signal Td^. The component further increases during a high acceleration and deceleration action. In addition, white noise is also superimposed. However, according to the setting of the averaging time constant T, the vibration component and the noise are gradually averaged like the calculation waveforms shown in FIG. 4. Therefore, it is possible to suppress the influence of the noise and the like and stably calculate the normal rotation load estimated value Tdp, the reverse rotation load estimated value Tdn, the normal rotation speed average vmp, and the reverse rotation speed average vmn conforming to the relation same as the relation of the friction characteristic of Formula (5). Further, normal rotation and reverse rotation actions of the driving machine 3 are automatically determined according to the sign determination signal sgn(vm). Therefore, it is possible to perform estimation in a normal operation action during actual operation of the driving machine 3.

Even when there is an error in the inertia estimated value Jn, according to the calculation, a load characteristic can be stably estimated without being easily affected by the error.

In the above explanation, the load torque signal Td^ coincides with the load torque Td. However, if there is an estimation error in the inertia estimated value Jn of Formula (3), an inertia error disturbance shown in a right side second term of Formula (9) is superimposed on the load torque signal Td^. In the formula, J indicates the inertia of the driving machine 3.

$$Td\hat{} = Td + (J - Jn) \cdot s \cdot vm \tag{9}$$

Figure 5:
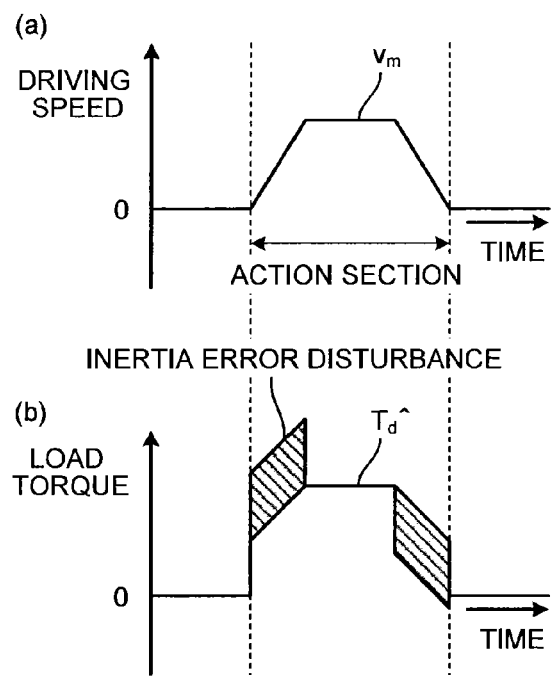
FIG. 5 is a diagram of a waveform indicating a relation between the driving speed vm and a temporal change of a load torque signal Td^.

FIG. 5 is a time response waveform indicating a relation between the driving speed vm (FIG. 5(*a*)) and the load torque signal Td^ (FIG. 5(*b*)) of the driving machine 3 obtained when the driving unit 2 is accelerated and decelerated in a normal rotation action direction. As shown in FIG. 5(*b*), if there is an error in the inertia estimated value Jn, an inertia error disturbance is superimposed on the load torque signal Td.

However, the inertia error disturbance is offset in an acceleration section and a deceleration section if averaged in the action section from the start to the stop of the driving machine 3. Therefore, by using the averaging filter F(s) including the sufficiently long averaging time constant T for the normal-rotation-average calculating unit 103 and the reverse-rotation-average calculating unit 104, final calculation values of the driving speed vm and the load torque signal Td^ converge on values of Formulas (8a) and (8b) according to the averaging.

An inertia error disturbance that occurs when an acceleration time and a deceleration time are different in the operation action of the driving machine 3 is examined. The inertia error disturbance is an error disturbance proportional to driving acceleration s·vm as indicated by Formula (9). The driving acceleration s·vm indicates a rate of change of the driving speed vm. Therefore, it goes without saying that an average of the driving acceleration s·vm, which is the rate of change of the driving speed vm, is zero in sections from the start to the stop of the machine such as a normal rotation action section and a reverse rotation action section of the driving machine 3. Therefore, even when the acceleration time and the deceleration time are different, the inertia error disturbance is offset in the acceleration section and the deceleration section according to the effect of the averaging in this embodiment explained above.

Consequently, a set of values of the normal rotation speed average vmp and the normal rotation load estimated value Tdp calculated by the normal-rotation-average calculating unit 103 and a set of values of the reverse rotation speed average vmn and the reverse rotation load estimated value Tdn calculated by the reverse-rotation-average calculating unit 104 quantitatively represent a load characteristic peculiar to the driving machine 3 according to action speed of the driving machine 3. It is possible to obtain a stable calculation result according to the setting of the averaging time constant T.

According to the calculation processing, even when the torque command Tr is directly used as the input to the normal-rotation-load calculating unit 103*b* and the reverse-rotation-load calculating unit 104*b* instead of the load torque signal Td^, the normal rotation load estimated value Tdp and the reverse rotation load estimated value Tdn converge to values of the right sides of the Formulas (8a) and (8b) according to the content explained above with reference to FIG. 5. Therefore, it is seen that the estimation processing for the load torque signal Td^ by the load-torque estimating unit 102 can be omitted.

The influence of a nonlinear error that occurs between the friction characteristic of the driving machine 3 and a model obtained by approximating the friction characteristic with a speed-proportional linear expression is explained.

Figure 6:
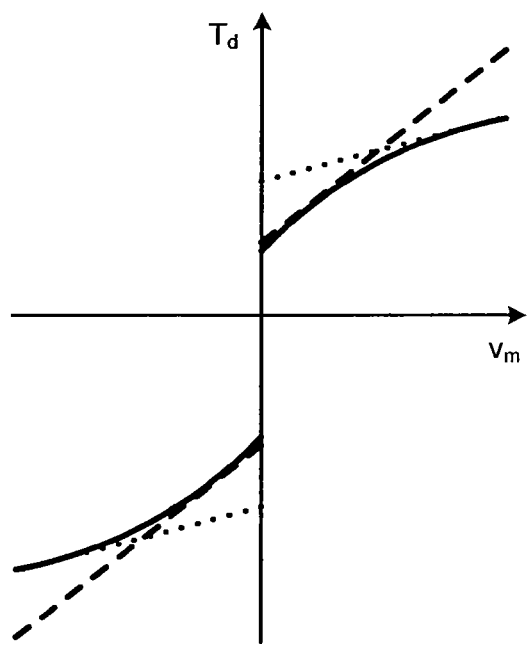
FIG. 6 is a diagram of an example of an estimation result of a coefficient of viscosity and a constant term according to an adaptive identification rule.

FIG. 6 shows an example in which the friction characteristic of the driving machine 3 is represented in detail. The abscissa represents the driving speed vm and the ordinate represents the load torque Td. That is, FIG. 6 shows a load characteristic corresponding to the driving speed vm. As indicated by a solid line in FIG. 6, strictly speaking, the friction characteristic of the driving machine 3 is a characteristic of a curved line rather than a straight line proportional to speed.

The friction characteristic has an error compared with the linear expression model indicated by Formulas (5a) and (5b).

Therefore, when a coefficient of viscosity and a constant term of a model obtained by approximating such a friction characteristic of the driving machine 3 using the load torque Td as a speed-proportional linear expression is estimated using, for example, the adaptive identification rule, as indicated by a broken line and a dotted line shown in FIG. 6, a different result is obtained according to an action state of the driving machine 3. The result of the broken line is an estimation result in a state in which a low-speed operation is continued (a low-speed operation condition). The result of the dotted line is an estimation result in a state in which a high-speed operation is continued (a high-speed operation condition).

In the friction characteristic shown in FIG. 6, in the case of the low-speed operation condition, the coefficient of viscosity and the constant term are estimated using information concerning a friction characteristic in a section in which speed is low. Therefore, the coefficient of viscosity representing a tilt of the broken line is large. An absolute value of the constant term, which is an intercept with the ordinate (a Td axis) is small. On the other hand, in the case of the high-speed operation condition, the coefficient of viscosity and the constant term are estimated using information concerning a friction characteristic in a section in which speed is high. Therefore, the coefficient of viscosity of the dotted line is smaller than that in the case of the low-speed operation condition. The absolute value of the constant term of the intercept with the ordinate is larger than that in the case of the low-speed operation condition. In this way, only because the friction characteristic is the characteristic of the curved line slightly deviating from the liner model of the linear expression, the coefficient of viscosity and the constant term approximated to the straight line of the linear expression are greatly different according to a difference in an action point such as low speed or high speed. A contradiction occurs that, although the estimation is performed for the same machine, a friction characteristic greatly changes according to the operation condition.

On the other hand, in this embodiment, as explained above, the same averaging filter is used for the normal-rotation-speed calculating unit 103*a* and the normal-rotation-load calculating unit 103*b* and the same averaging filter is used for the reverse-rotation-speed calculating unit 104*a* and the reverse rotation load calculating unit 104*b*. The calculation for averaging is applied to the driving speed vm and the load torque signal Td^ with a sufficiently long time constant. The load characteristic peculiar to the machine system is used as a set of values obtained by averaging speed and load torque. Therefore, effects explained below are obtained.

Figure 7:
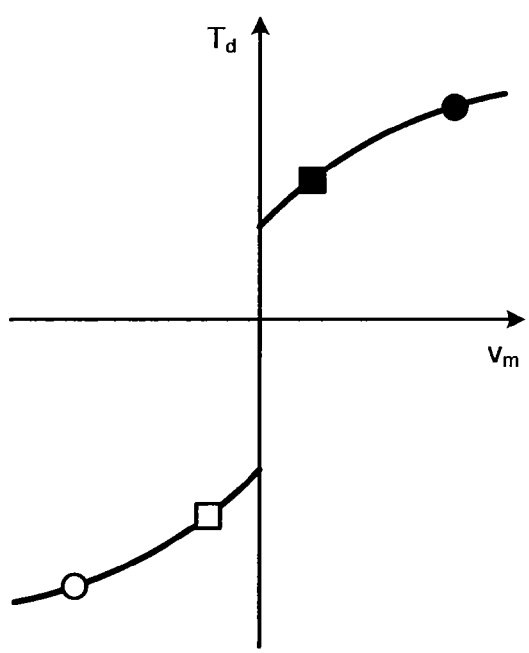
FIG. 7 is a diagram of an example of an estimation result by the load characteristic estimating apparatus according to the first embodiment of the present invention.

FIG. 7 is an example of an estimation result by the load characteristic estimating apparatus 100 for the driving machine according to this embodiment. In the figure, a solid line indicates a detailed friction characteristic of the driving machine 3. A plot point of a black circle indicates a set of values of the normal rotation speed average vmp and the normal rotation load estimated value Tdp under the high-speed operation condition in the normal rotation action section. A plot point of a black square indicates a set of values of the normal rotation speed average vmp and the normal rotation load estimated value Tdp under the low-speed operation condition in the normal rotation action section. A plot point of a white circle indicates a set of values of the reverse rotation speed average vmn and the reverse rotation load estimated value Tdn under the high-speed operation condition in the reverse rotation action section. A plot point of a white square indicates a set of values of the reverse rotation speed average vmn and the reverse rotation load estimated value Tdn under the low-speed operation condition in the reverse rotation action section.

According to this embodiment, a set of values of speed and load torque obtained by averaging information concerning a friction characteristic of a curved line in a section in which speed is low is stably estimated as a load characteristic under the low-speed operation condition, and a set of values of speed and load torque obtained by averaging information concerning a friction characteristic in a section in which speed is high stably estimated as a load characteristic under the high-speed operation condition. As a result, as shown in FIG. 7, sets of values obtained by averaging speed and load torque estimated according to various operation conditions such as the low-speed operation condition and the high-speed operation condition are obtained to substantially coincide with a curved line of the detailed friction coefficient of the driving machine 3. When low-speed operation and high-speed operation are equally repeated, sets of average speed and average load torque of the low-speed operation and the high-speed operation are stably estimated as a load characteristic.

The characteristics and the averaging time constants T of the averaging filters F(s) of the normal-rotation-speed calculating unit 103*a* and the normal-rotation-load calculating unit 103*b* are set to be the same. The characteristics and the averaging time constants T of the averaging filters F(s) of the reverse-rotation-speed calculating unit 104*a* and the reverse-rotation-load calculating unit 104*b* are set to be the same. Therefore, a set of values the normal rotation speed average vmp and the normal rotation load estimated value Tdp calculated by the normal-rotation-average calculating unit 103 and a set of values of the reverse rotation speed average vmn and the reverse rotation load estimated value Tdn calculated by the reverse-rotation-average calculating unit 104 do not greatly deviate from the line of the detailed friction characteristic of the driving machine 3 even when, for example, an operation condition changes from the low-speed operation condition to the high-speed operation condition.

That is, even when the operation condition changes in this way, an estimation result moves from the plot point of the square, which is the estimation result under the low-speed operation condition, to the plot point of the circle, which is the estimation result under the high-speed operation condition, shown in FIG. 7 without greatly deviating from the line of the detailed friction characteristic of the driving machine 3.

Therefore, as shown in FIG. 7, even when a nonlinear error occurs between the friction characteristic of the driving machine 3 and the model obtained by approximating the friction characteristic with a speed-proportional linear expression, it is possible to stably and quantitatively detect the friction characteristic, i.e., the load characteristic peculiar to the driving machine 3 with a small error without being affected by various operation conditions such as a simple reciprocating action and a combined action of low-speed and high-speed actions.

Details of determination processing for an abnormality and deterioration of the driving machine 3 by the output-result determining unit 105 are explained with reference to FIG. 8.

As shown in FIG. 1, the normal rotation speed average vmp, the normal rotation load estimated value Tdp, the reverse rotation speed average vmn, and the reverse rotation load estimated value Tdn, which are the output results of the normal-rotation-average calculating unit 103 and the reverse-rotation-average calculating unit 104, are input to the output-result determining unit 105. A normal range of a load of the driving machine 3 is stored in the output-result determining unit 105 as data. The output-result determining unit 105 compares the stored normal range and a set of values of the normal rotation speed average vmp and the normal rotation load estimated value Tdp and a set of values of the reverse rotation speed average vmn and the reverse rotation load estimated value Tdn input thereto and outputs the diagnosis result signal R obtained by determining whether the driving machine 3 is normal or abnormal.

Figure 8:
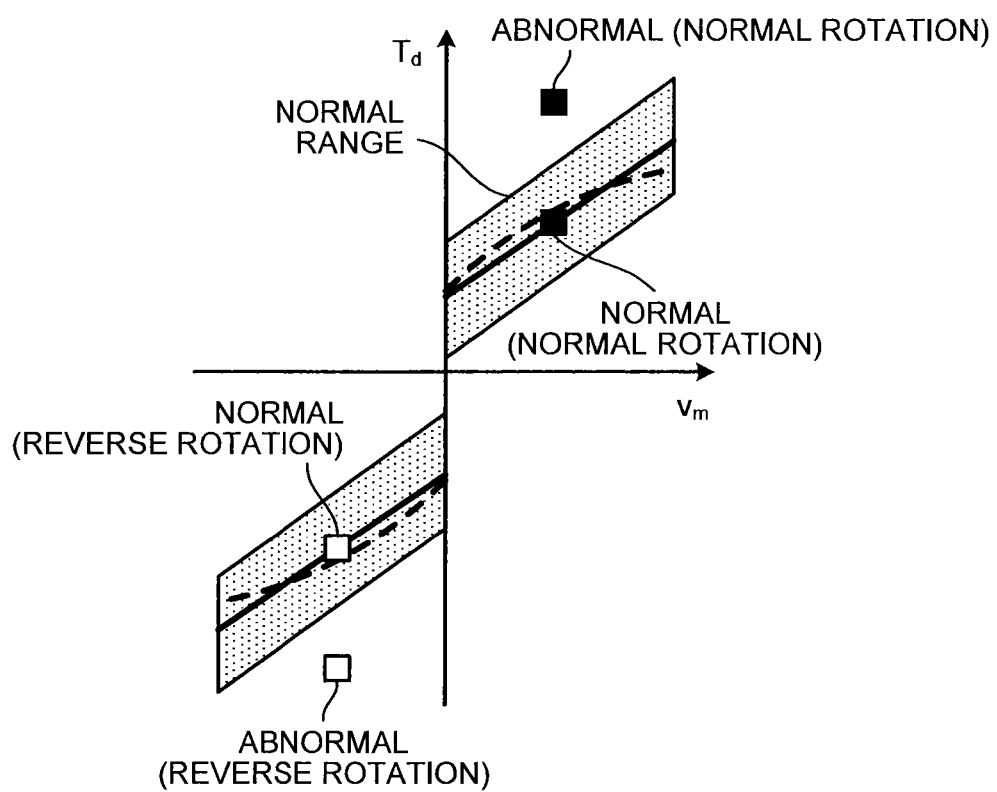
FIG. 8 is a diagram of a determination example of an estimation result by an output-result determining unit in the first embodiment.

FIG. 8 is a diagram of an example of determination of an abnormality and deterioration of the driving machine 3 in the output-result determining unit 105. In FIG. 8, a solid line indicates a friction characteristic obtained by approximating the detailed friction characteristic of the driving machine 3 indicated by a broken line with two speed-dependent linear expression models respectively corresponding to the normal rotation action and the reverse rotation action of the driving machine 3. A liner expression model of the solid line has can be obtained by, for example, measurement from driving data in a wide action range from the low-speed operation to the high-speed operation sampled from the driving machine 3. A hatched range shown in FIG. 8 with margin width appropriately set with the solid line as a reference is stored in the output-result determining unit 105 as a normal range of a load of the driving machine 3.

A set of values of the normal rotation speed average vmp and the normal rotation load estimated value Tdp and a set of values of the reverse rotation speed average vmn and the reverse rotation load estimated value Tdn estimated by the normal-rotation-average calculating unit 103 and the reverse-rotation-average calculating unit 104 are input to the output-result determining unit 105 in which such a normal range is stored. Then, when the driving machine 3 is normal, these sets are present near the broken line and within the gray normal range in FIG. 8 according to the characteristic of the load characteristic estimating apparatus 100 according to this embodiment.

However, when an abnormality, deterioration, or the like occurs in the driving machine 3 and a load such as friction increases because of the abnormality, the deterioration, or the like, a set of values obtained by averaging speed and load torque greatly deviates from the vicinity of the broken line and deviates from the hatched normal range in FIG. 8. Therefore, when a set of values obtained by averaging speed and load torque input to the output-result determining unit 105 deviates from the hatched normal range as shown in FIG. 8, it is determined that an abnormality, deterioration or deterioration has occurred in a driving state of the driving machine 3.

In the above explanation, the averaging filters F(s) of the normal-rotation-average calculating unit 103 and the reverse-rotation-average calculating unit 104 are explained as having the same characteristic. However, it goes without saying that, for example, even if the orders of the averaging filters F(s) are different, the same characteristic can be obtained as long as the averaging time constants T are substantially the same. It goes without saying that the same characteristic can be approximately obtained even if the averaging time constants T are not completely the same in the averaging filters F(s) and, for example, a difference of about 30% is present. When the driving machine 3 acts to repeat the same pattern, if the average time constant T is sufficiently long, the normal rotation speed average vmp, the normal rotation load estimated value Tdp, the reverse rotation speed average vmn, and the reverse rotation load estimated value Tdn, which are the outputs of the normal-rotation-average calculating unit 103 and the reverse-rotation-average calculating unit 104, converge to the same values. Therefore, the averaging time constant does not have to be strictly the same value.

In the above explanation, the load characteristic estimating apparatus 100 includes the normal-rotation speed calculating unit 103a and the reverse-rotation-speed calculating unit 104a. The output-result determining unit 105 is configured to determine the diagnosis result signal R based on the normal rotation speed average vmp and the reverse rotation speed average vmn calculated by the normal-rotation speed calculating unit 103a and the reverse-rotation-speed calculating unit 104a. However, for example, when the driving machine 3 is a component mounting machine, in the normal operation action, the action command Ipv of the action-command generating unit 5 is often generated as repetition of a plurality of action patterns. In such a case, values of the normal rotation average vmp and the reverse rotation average vmn do not greatly change. The values can be grasped in advance. Therefore, in such a case, even if the load characteristic estimating apparatus 100 does not include the normal-rotation speed calculating unit 103a and the reverse-rotation-speed calculating unit 104a, it is possible to grasp the load characteristic peculiar to the driving machine 3 based on only the normal rotation load estimated value Tdp and the reverse rotation load estimated value Tdn. By monitoring changes in the values in the output-result determining unit 105, it is possible to determine whether an abnormality or deterioration has occurred in the driving state of the driving machine 3.

In the above explanation, the load characteristic estimating apparatus 100 for the driving machine according to this embodiment includes the output-result determining unit 105 and is configured to output the diagnosis result signal R obtained by determining whether the driving machine 3 is normal or abnormal. However, the output-result determining unit 105 can operate at an extremely long time interval compared with the other components. Therefore, the output result determining unit 105 can be realized as a function of an external host apparatus different from the other components.

If the normal rotation speed average vmp, the normal rotation load estimated value Tdp, the reverse rotation speed average vmn, and the reverse rotation load estimated value Tdn, which are most characteristic signals in the load characteristic estimating apparatus 100 according to this embodiment, can be obtained, for example, work equivalent to the operation of the output-result determining unit 105 can also be periodically manually determined and executed. That is, the load characteristic estimating apparatus 100 can be configured to output the normal rotation speed average vmp, the normal rotation load estimated value Tdp, the reverse rotation speed average vmn, and the reverse rotation load estimated value Tdn.

In this embodiment, a general motor that generates turning force, i.e., torque as driving force is assumed as the driving unit 2. However, it goes without saying that a driving unit that generates linear thrust as driving force like a linear motor can be implemented in completely the same manner.

As explained above, the load characteristic estimating apparatus 100 according to this embodiment is configured to stably output a numerical value including information concerning friction and the like without adding special operation even when the driving machine is caused to act under a normal operation condition, which is not always a special action pattern. Specifically, the load characteristic estimating apparatus 100 includes the sign determining unit 101, the normal-rotation-load calculating unit 103b, and the reverse-rotation-load calculating unit 104b and configured to sequentially average the load torque signal Td^ with a sufficiently long time constant individually for a normal rotation section and a reverse rotation section and calculate the normal rotation load estimated value Tdp and the reverser rotation load estimated value Tdn. Consequently, it is possible to provide a load characteristic estimating apparatus for a driving machine that removes, even under a condition of a normal operation action in which normal rotation, reverse rotation, and acceleration and deceleration patterns of different moving distances are mixed, the influence of an inertia estimation error, noise, and the like, stably obtains a numerical value representing a load characteristic including friction and the like of the driving machine 3, and can be used for a wide range of applications such as diagnosis of the driving machine and a grasp of a characteristic change.

Further, the load characteristic estimating apparatus 100 includes the normal-rotation-speed calculating unit 103a and the reverse-rotation-speed calculating unit 104a and calculates the normal rotation speed average vmp and the reverse rotation speed average vmn. Therefore, even when operation conditions such as a state in which the low-speed operation continues and a state in which the high-speed operation continues change, as a combination of a speed average and a load estimated value, a numerical value representing a load characteristic of the driving machine 3 can be stably obtained according to an operation condition. Therefore, it is possible to provide the load characteristic estimating apparatus for the driving machine that can be used for a wider range of applications.

Second Embodiment

Figure 9:
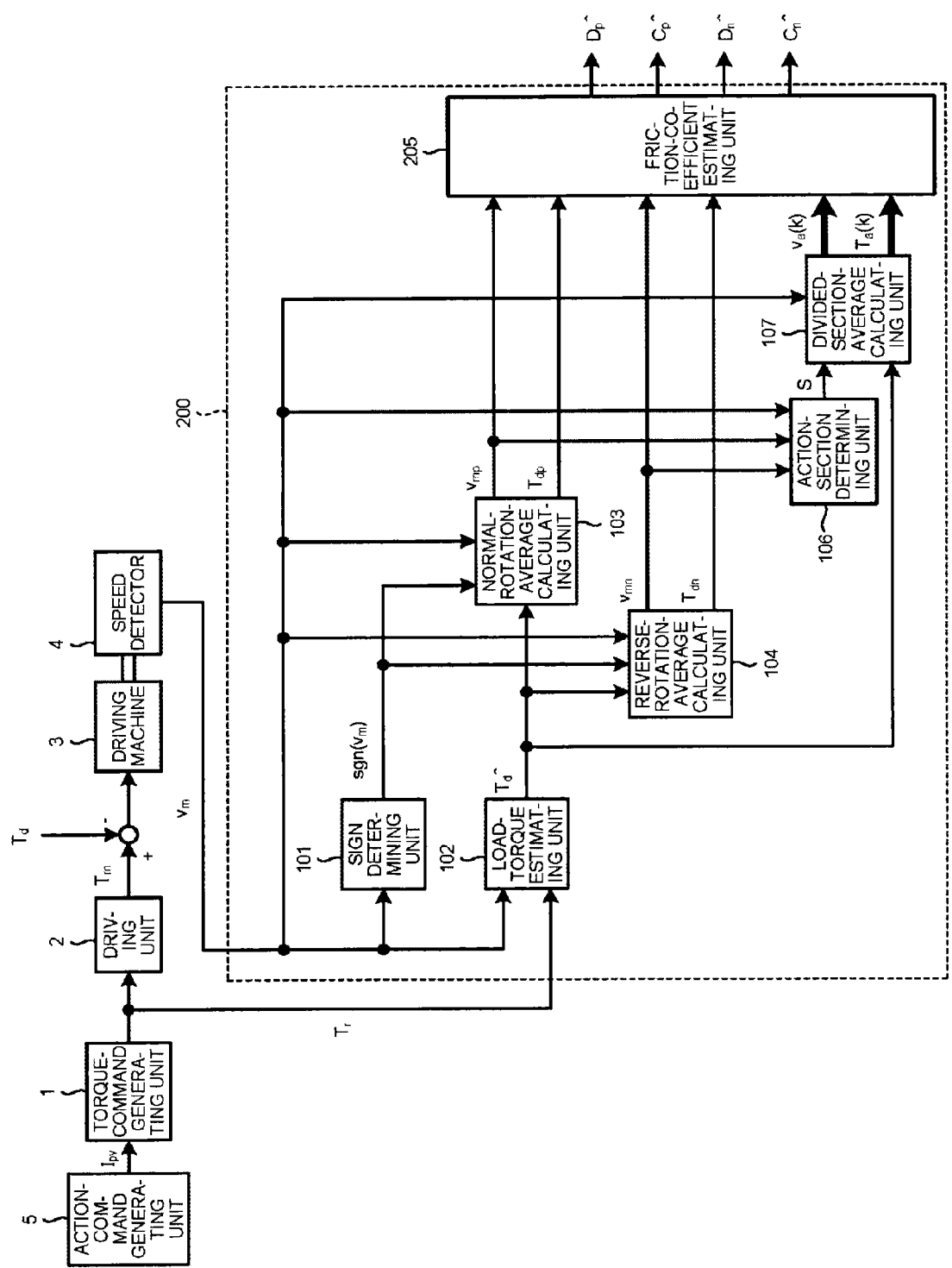
FIG. 9 is a block diagram of the configuration of a load characteristic estimating apparatus for a driving machine according to a second embodiment of the present invention.

FIG. 9 is a block diagram of the configuration of a load characteristic estimating apparatus 200 for a driving machine according to a second embodiment of the present invention.

As shown in FIG. 9, in the load characteristic estimating apparatus 200 according to the second embodiment, an action-section determining unit 106 and a divided-section-average calculating unit 107 are added to the internal configuration of the load characteristic estimating apparatus 100 for the driving machine shown in FIG. 1. The load characteristic estimating apparatus 200 includes a friction-coefficient estimating unit 205 instead of the output-result determining unit 105.

In FIG. 9, explanation of the torque-command generating unit 1, the driving unit 2, the driving machine 3, the speed detector 4, the action-command generating unit 5, the sign determining unit 101, the load-torque estimating unit 102, the normal-rotation-average calculating unit 103, and the reverse-rotation-average calculating unit 104 is omitted because inputs, outputs, functions, operations, and the like thereof are the same as those in the first embodiment.

The driving speed vm of the driving machine 3, which is the output of the speed detector 4, the normal rotation speed average vmp, which is the output of the normal-rotation-speed calculating unit 103a, and the revere rotation speed average vmn, which is an output of the reverse-rotation-speed calculating unit 104a, are input to the action-section determining unit 106.

In the normal rotation action section of the driving machine 3, the action-section determining unit 106 sets the normal rotation speed average vmp as a threshold, determines a high-speed action section, in which the driving speed vm is larger than the threshold vmp, as a section 1, and determines a low-speed action section, in which the driving speed vm is smaller than the threshold vmp, as a section 2. In the reverse rotation action section of the driving machine 3, the action-section determining unit 106 sets an absolute value of the reverse rotation speed average vmn as a threshold, determines a high-speed action section, in which an absolute value of the driving speed vm is larger than the threshold (an absolute value of vmn), as a section 3, and determines a low-speed action section, in which the absolute value of the driving speed vm is smaller than the threshold (the absolute value of vmn), as a section 4.

That is, the action-section determining unit 106 determines in which section among the four sections the driving machine 3 is acting and outputs an action section division signal S having information concerning the four sections. In the action section division signal S, for example, numerical values 1, 2, 3, 4, and 0 only have to be respectively allocated to the section 1, the section 2, the section 3, the section 4, and a stop state. The division of the sections is explained below with reference to FIG. 10.

The action section division signal S, the driving speed vm, the load torque signal $\hat{Td}$ are input to the divided-section-average calculating unit 107. The divided-section-average calculating unit 107 outputs four section speed averages va(k) and four section load estimated values Ta(k) to correspond to the respective sections k (k=1, 2, 3, and 4) divided according to the action section division signal S.

The section speed average va(k) is a value obtained by sequentially applying an averaging calculation to the driving speed vm in the section k. The section load estimated value Ta(k) is a value obtained by sequentially applying the averaging calculation to the load torque signal $\hat{Td}$ in the section k. Two outputs of the section speed average va(k) and the section load estimated value Ta(k) of the divided-section-average calculating unit 107 shown in FIG. 9 are vector signals having information concerning four values respectively averaged in the four sections (k).

Because the calculation in the divided-section-average calculating unit 107 and the action-section determining unit 106 and the divided-section-average calculating unit 107 are added, it is possible to grasp the load characteristic peculiar to the machine system more in detail. This is explained with reference to FIG. 10.

Figure 10:
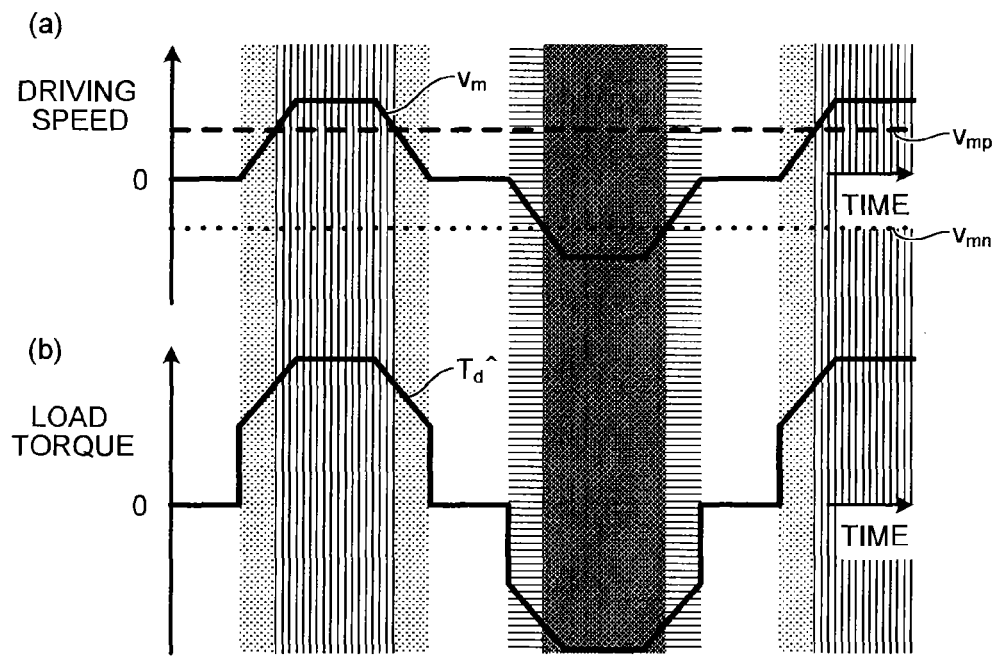
FIG. 10 is a diagram of states of estimation sections obtained by dividing driving speed by a speed threshold.

FIG. 10 is an example showing time responses of the driving speed vm (FIG. 10(a)) and the load torque signal $\hat{Td}$ (FIG. 10(b)) obtained by causing the driving machine to perform a certain predetermined action while appropriately controlling the position and the speed of the driving machine. In FIG. 10, the normal rotation speed average vmp, which is the output of the normal-rotation-speed calculating unit 103a, is indicated by a broken line and the reverse rotation speed average vmn, which is the output of the reverse-rotation-speed calculating unit 104a, is indicated by a dotted line. A time section divided into sections corresponding to the four action states in the section 1, the section 2, the section 3, and the section 4 based on the determination performed by setting the normal rotation speed average vmp and the reverse rotation speed average vmn to be thresholds is shown.

For example, in the section 1 shown in FIG. 10, based on the action section division signal S input from the action-section determining unit 106, the divided-section-average calculating unit 107 outputs, as a first section speed average va(1), a result obtained by applying a sequential averaging calculation to the driving speed vm and outputs, as a first section load estimated value Ta(1), a result obtained by applying the sequential averaging calculation to the load torque signal $\hat{Td}$ in a time section in which the driving machine 3 acts in the section 1. At this point, the divided-section-average calculating unit 107 retains k-th section speed averages va(k) and k-th section load estimated values Ta(k) of k other than k=1, i.e., k=2, 3, and 4 without updating the values.

The divided-section-average calculating unit 107 performs the same action in time sections in which the driving machine 3 acts in the other sections n. Based on the action section signal S, the divided-section-average calculating unit 107 outputs, as an n-th section speed average va(n), a result obtained by sequentially applying an averaging calculation to the driving speed vm and outputs, as an n-th section load estimated value Ta(n), a result obtained by sequentially applying the averaging calculation to the load torque signal Td^ in a time section in which the driving machine 3 acts in the section n. At this point, the divided-section-average calculating unit 107 retains k-th section speed averages va(k) and k-th section load estimated values Ta(k) of k other than k=n without updating the values.

Transfer characteristics of averaging filters used for the calculation of the averages of the driving speed vm and the load torque signal Td^ in the sections k in the divided-section-average calculating unit 107 are the same. As used in the normal-rotation-average calculating unit 103 and the reverse-rotation-average calculating unit 104, the averaging filters are the averaging filters F(s) indicated by Formula (4) having the average time constant T sufficiently longer than the time required by the driving machine 3 to perform an action from the start to the stop once.

In the load characteristic estimating apparatus 200 for the driving machine according to this embodiment, as in the first embodiment, the normal rotation speed average vmp and the normal rotation load estimated value Tdp output by the normal-rotation-average calculating unit 103 and the reverse rotation speed average vmn and the reverse rotation load estimated value Tdn output by the reverse-rotation-average calculating unit 104 are calculated. In the load characteristic estimating apparatus 200 according to this embodiment, further, for the four divided sections k in total divided into the high-speed action sections and the low-speed action sections respectively in the normal rotation and reverse rotation action sections by the added action-section determining unit 106, the calculation of the section speed averages va(k) and the section load estimated values Ta(k) is performed by the added divided-section-average calculating unit 107. In this way, the driving speed and the load torque are averaged in the divided action sections. Consequently, a larger number of different sets of averaged driving speed and load torque representing the load characteristic peculiar to the machine system are obtained. It is possible to obtain a two-dimensional relation between speed and load driving force.

In the calculation of the respective section speed averages va(k) and the respective section load estimated values Ta(k), the divided-section-average calculating unit 107 performs the same calculation using the averaging filter F(s) having the sufficiently long averaging time constant T in the normal-rotation-average calculating unit 103 and the reverse-rotation-average calculating unit 104. Therefore, it is possible to remove the influence of white noise, a vibration component due to the rigidity of the driving machine, and the like and stably quantify the load characteristic peculiar to the machine system.

Concerning an inertia error disturbance due to an error of the inertia estimated value Jn, an error during acceleration and an error during deceleration are respectively offset by a sufficient averaging calculation. It is possible to calculate the section load estimated value Ta(k) as the load torque signal Td^ from which the inertia error disturbance is removed. The normal rotation speed average vmp and the reverse rotation average vmn are used as speed thresholds in estimation section division. Therefore, it is possible to automatically divide an estimation section according to various operation conditions such as low-speed operation and high-speed operation.

Figure 11:
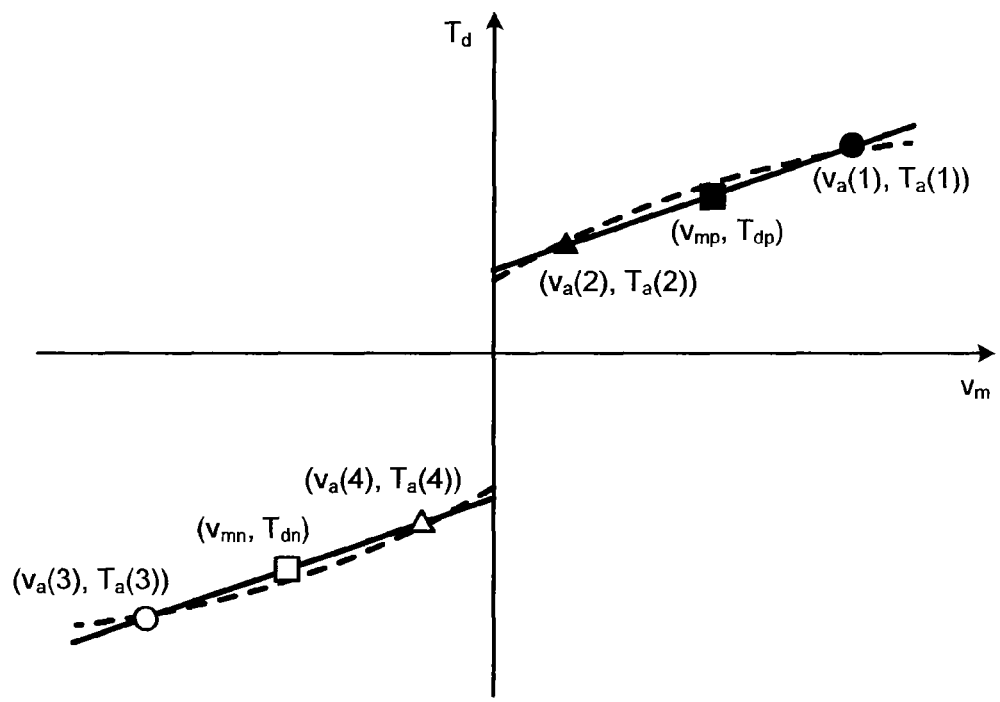
FIG. 11 is a diagram of a state in which estimation results in the estimation sections divided by the speed threshold are approximated by a linear expression model.

FIG. 11 shows outputs of the normal-rotation-average calculating unit 103, the reverse-rotation-average calculating unit 104, and the divided-section-average calculating unit 107. In FIG. 11, calculation results of a set of values of the normal rotation speed average vmp and the normal rotation torque average Tdp, a set of values of the reverse rotation speed average vmn and the reverse rotation torque average Tdn, and sets of values of the section speed averages va(k) and the section torque averages Ta(k) are plotted. According to the content explained above, these results are estimated in a range of a small error near a curved line indicating a detailed friction characteristic of the driving machine 3 indicated by a broken line in the figure. A solid line is explained below.

As explained above, the load characteristic estimating apparatus 200 for the driving machine including the configuration shown in FIG. 9 calculates load characteristics for a plurality of speeds as stable numerical values while operating the driving machine in arbitrary action patterns. Consequently, it is possible to grasp a more detailed load characteristic peculiar to the machine system.

The operation of the friction-coefficient estimating unit 205 is explained. As explained below, the friction-coefficient estimating unit 205 estimates a coefficient of viscosity and a constant term obtained when the detailed friction characteristic of the driving machine 3 is approximated by a speed-dependent linear expression model.

Values of three plots (sets of values of averaged driving speed and load torque) corresponding to each of the positive and negative values of the driving speed vm shown in FIG. 11, which are calculation results of the normal-rotation-average calculating unit 103, the reverse-rotation average calculating unit 104, and the divided-section-average calculating unit 107, are input to the friction-coefficient estimating unit 205. The friction-coefficient estimating unit 205 performs an estimation calculation of a coefficient of viscosity Dp^ and a constant term Cp^ during the normal rotation action and a coefficient of viscosity Dn^ and a constant term Cn^ during the reverse rotation action obtained when the detailed friction characteristic of the driving machine 3 is approximated by the linear expression model like Expressions (5a) and (5b) based on these values. As a method of the calculation, for example, a batch-type least squares method has only to be applied to the respective cases of normal rotation and reverse rotation using three values of driving speed and three values of load torque.

A solid line shown in FIG. 11 is a straight line indicating a friction characteristic estimated by least squares using the calculation results of the normal-rotation-average calculating unit 103, the reverse-rotation average calculating unit 104, and the divided-section-average calculating unit 107. In FIG. 11, a tilt of the solid line in a region where the driving speed vm is positive corresponds to the coefficient of viscosity Dp^, an intercept with the ordinate (a load torque axis) in the region corresponds to the constant term Cp^, a tilt of the solid line in a region where the driving speed vm is negative corresponds to the coefficient of viscosity Dn^, and an intercept with the ordinate (the load torque axis) in the region corresponds to the constant term Cn^.

Characteristics of effects obtained in the second embodiment are explained. For example, when the constant term C and the coefficient of viscosity D are directly estimated from the driving speed vm and the load torque signal Td^ by a method such as the method of least squares as in the technology described in Patent Literature 2, as explained above, there is a problem in that an estimation result of a coefficient of viscosity and a constant term fluctuates according to a change in the level of the moving speed vm or an operation pattern.

contrary to this, according to this embodiment, in the six action sections including, in addition to the two action sections, i.e., the normal rotation action section and the reverse rotation action section of the driving machine 3, the four action sections, i.e., the high-speed action section and the low-speed action section of the normal rotation action state of the driving machine 3 and the high-speed action section and the low-speed action section of the reverse rotation action state of the driving machine 3 divided based on the threshold set for the driving speed vm, as explained above, it is possible to stably estimate sets of values of averaged driving speed and load torque representing the load characteristic peculiar to the machine system. Further, according to a calculation performed by collectively using a plurality of stably-estimated sets, it is possible to stably estimate, even for a condition change such as the level of speed, a coefficient of viscosity and a constant term of a linear expression model obtained by approximating a friction characteristic of the driving machine.

In the first embodiment, a set of values of the averaged driving speed vm and load torque Td represents the load characteristic peculiar to the driving machine 3 as one point for each of positive and negative of the driving speed vm. On the other hand, in the second embodiment, because calculation results of the normal-rotation-average calculating unit 103, the reverse-rotation-average calculating unit 104, and the divided-section-average calculating unit 107 are used, it is possible to easily represent the detailed friction characteristic of the driving machine 3 as two parameters, i.e., a coefficient of viscosity and a constant term of a linear expression model corresponding to speed. That is, it is possible to stably estimate a load characteristic as a straight line and grasp the load characteristic more in detail.

As in the first embodiment, it is also possible to monitor an abnormality of the driving machine 3 by monitoring a change with time of an estimation result in the second embodiment. Although not specifically explained, it is also possible to contribute to control accuracy by using the estimation result in the second embodiment as friction compensation in controlling the position and the speed of the driving machine 3.

In the second embodiment, the normal rotation speed average vmp and the reverse rotation speed average vmn are input to the action-section determining unit 106 as the thresholds in the estimation section division. Concerning the thresholds, one or more appropriate thresholds can be set from the outside. Even if an estimation section is further subdivided by the one or more thresholds, sets of averages of speed and load torque in sections are stably derived. Therefore, it is also possible to grasp the load characteristic peculiar to the machine system more in detail.

That is, when the estimation section is subdivided by the thresholds set from the outside, it goes without saying that, even if the normal-rotation-average calculating unit 103 and the reverse-rotation-average calculating unit 104 are deleted from the components in the second embodiment, it is possible to represent the detailed friction characteristic of the driving machine 3 as two parameters, i.e. a coefficient of viscosity and a constant term of a linear expression model corresponding to speed using only a calculation result of the divided-section-average calculating unit 107.

In the second embodiment, because the load characteristic estimating apparatus 200 for the driving machine is configured as explained above, it is possible to provide the load characteristic estimating apparatus for the driving machine that can stably and sequentially estimate the load characteristic peculiar to the driving machine 3 more in detail while suppressing the influence of noise and an error of an inertia estimated value and coping with various operation conditions such as the level of speed and the length of an acceleration and deceleration time and changes of the operation conditions, and can be used for a wider range of applications. That is, because a characteristic of a load applied to the driving machine 3 can be stably linearly approximated according to the normal operation action, it is possible to apply a result of the estimation to a wide range of applications such as a grasp of a characteristic change of the driving machine 3 and friction compensation in the control of the driving machine 3.

In the first and second embodiments, it is possible to stably estimate a characteristic of a load applied to the driving machine 3 in the normal operation action. It is possible to apply a result of the estimation to a wide range of applications such as diagnosis of the driving machine 3 and a grasp of a characteristic change. Further, it is possible to stably estimate a characteristic of a load applied to the driving machine 3 even when an action command is changed during the operation of the driving machine 3 and it is possible to stably estimate a characteristic of a load applied to the driving machine 3 with respect to a transient change of an operation condition such as high-speed operation or low-speed operation. Further, by setting a time constant of calculation for calculating a sequential average to a value larger than time required by an action command to perform an action from the start to the stop once, it is possible to suppress error disturbance due to an error of an inertia estimated value and suppress noise, a vibration component, and the like. Because the calculation results of the normal-rotation-average calculating unit 103 and the reverse-rotation-average calculating unit 104 are used, it is possible to determine whether an operation state of the driving machine 3 is normal or abnormal.

Further, the present invention is not limited to the embodiments and can be variously modified in an implementation stage without departing from the spirit of the present invention. The embodiments include inventions in various stages. Various inventions can be extracted according to appropriate combinations of a plurality of constituent features disclosed herein.

For example, when the problems explained in the summary can be solved and the effects explained in the advantageous effects of invention are obtained even if several constituent features are deleted from all the constituent features explained in the respective first and second embodiments, a configuration from which the constituent features are deleted can be extracted as an invention. Further, the constituent features explained in the first and second embodiments can be combined as appropriate.

Industrial Applicability

As explained above, the load characteristic estimating apparatus for the driving machine according to the present invention is useful for a load characteristic estimating apparatus for a driving machine in which a driving device such as a servo motor in a machine tool or a robot is used. In particular, the load characteristic estimating apparatus for the driving machine according to the present invention is suitable for a load characteristic estimating apparatus for a driving machine that stably quantifies, while coping with various operation conditions and changes in the operation conditions, a load characteristic peculiar to a machine system such as friction of the driving machine such that fluctuation with time of the load characteristic can also be grasped.

REFERENCE SIGNS LIST

1 Torque-command generating unit
2 Driving unit
3 Driving machine
4 Speed detector
5 Action-command generating unit 100, 200 Load characteristic estimating apparatuses for a driving machine
101 Sign determining unit
102 Load-torque estimating unit
103 Normal-rotation-average calculating unit
103a Normal-rotation-speed calculating unit
103b Normal-rotation-load calculating unit
Reverse-rotation-average calculating unit
104a Reverse-rotation-speed calculating unit
104b Reverse-rotation-load calculating unit
105 Output-result determining unit
106 Action-section determining unit
107 Divided-section-average calculating unit
205 Friction-coefficient estimating unit

The invention claimed is:

1. A load characteristic estimating apparatus for a driving machine comprising:
an action-command generating unit configured to generate an action command including a command for an action for a position of the driving machine and a command for an action for speed of the driving machine;
a driving-force-command generating unit configured to generate a driving force command to cause an action of the driving machine to follow the action command;
a driving unit configured to generate driving force corresponding to the driving force command and drive the driving machine;
a sign determining unit configured to determine, based on driving speed of the driving machine, in which state among a normal rotation action state, a reverse rotation action state, and a stop state the driving machine is;
a load-driving-force estimating unit configured to calculate, based on the driving force command or a signal representing the driving force, a load driving force signal, which is an estimated value of load driving force applied to the driving machine;
a normal-rotation-load calculating unit configured to calculate a sequential average of the load driving force signal when a result of the determination of the sign determining unit is the normal rotation action state; and
a reverse-rotation-load calculating unit configured to calculate a sequential average of the load driving force signal when the result of the determination of the sign determining unit is the reverse rotation action state,
a normal-rotation-speed calculating unit configured to calculate a sequential average of the driving speed when the result of the determination of the sign determining unit is the normal rotation action state; and
a reverse-rotation-speed calculating unit configured to calculate a sequential average of the driving speed when the result of the determination of the sign determining unit is the reverse rotation action state.

2. The load characteristic estimating apparatus for the driving machine according to claim 1, wherein
the normal-rotation-speed calculating unit has a transfer characteristic same as a transfer characteristic of the normal-rotation-load calculating unit, and
the reverse-rotation-speed calculating unit has a transfer characteristic same as a transfer characteristic of the reverse-rotation load calculating unit.

3. The load characteristic estimating apparatus for the driving machine according to claim 1, further comprising an output-result determining unit configured to determine whether each of a set of the average calculated by the normal-rotation load calculating unit and the average calculated by the normal-rotation-speed calculating unit and a set of the average calculated by the reverse-rotation-load calculating unit and the average calculated by the reverse-rotation-speed calculating unit is within a predetermined normal range.

4. The load characteristic estimating apparatus for the driving machine according to claim 3, wherein the output-result determining unit sets the predetermined normal range based on two linear expressions indicating relations between the driving speed and the load driving force respectively corresponding to the normal rotation action state and the reverse rotation action state of the driving machine.

5. The load characteristic estimating apparatus for the driving machine according to claim 1, wherein
the normal-rotation-load calculating unit sets a time constant of a calculation for calculating the sequential average to a value larger than time required by the action command from start to stop, and
the reverse-rotation-load calculating unit sets a time constant of a calculation for calculating the sequential average to a value larger than time required by the action command from start to stop.

6. A load characteristic estimating apparatus for a driving machine comprising:
an action-command generating unit configured to generate an action command including a command for an action for a position of the driving machine and a command for an action for speed of the driving machine;
a driving-force-command generating unit configured to generate a driving force command to cause an action of the driving machine to follow the action command;
a driving unit configured to generate driving force corresponding to the driving force command and drive the driving machine;
a sign determining unit configured to determine, based on driving speed of the driving machine, in which state among a normal rotation action state, a reverse rotation action state, and a stop state the driving machine is;
a load-driving-force estimating unit configured to calculate, based on the driving force command for a signal representing the driving force, a load driving force signal, which is an estimated value of load driving force applied to the driving machine;
an action-section determining unit configured to determine, based on the driving speed, a result of the determination of the sign determining unit, a first speed threshold in the normal rotation action state of the driving machine, and a second speed threshold in the reverse rotation action state of the driving machine, in which state of a plurality of action sections divided according to a level relation of the driving speed the driving machine is; and
a divided-section-average calculating unit configured to calculate, based on a result of the determination of the action-section determining unit, a sequential average of the load driving force signal for each of the action sections and calculate, based on the result of the determination of the action-section determining unit, a sequential average of the driving speed for each of the action sections.

7. The load characteristic estimating apparatus for the driving machine according to claim 6, further comprising a friction-coefficient estimating unit configured to estimate a coefficient of viscosity and a constant term in a linear expression model of the load driving force by approximating, with two linear expressions representing a relation between the driving speed and the load driving force respectively corresponding to the normal rotation action state and the reverse rotation action state, a set of the sequential average of the load driving force signal and the sequential average of the driving speed calculated for each of the action sections.

8. The load characteristic estimating apparatus for the driving machine according to claim 7, further comprising:

a normal-rotation-load calculating unit configured to calculate a sequential average of the load driving force signal when the result of the determination of the sign determining unit is the normal rotation action state;

a reverse-rotation-load calculating unit configured to calculate a sequential average of the load driving force signal when the result of the determination of the sign determining unit is the reverse rotation action state;

a normal-rotation-speed calculating unit configured to calculate a sequential average of the driving speed when the result of the determination of the sign determining unit is the normal rotation action state; and a reverse-rotation-speed calculating unit configured to calculate a sequential average of the driving speed when the result of the determination of the sign determining unit is the reverse rotation action state, wherein the friction-coefficient estimating unit further uses, for the estimation of the coefficient of viscosity and the constant term, a set of the average calculated by the normal-rotation-load calculating unit and the average calculated by the normal-rotation-speed calculating unit and a set of the average calculated by the reverse-rotation-load calculating unit and the average calculated by the reverse-rotation-speed calculating unit.

9. The load characteristic estimating apparatus for the driving machine according to claim 7, wherein the approximation is performed by a method of least squares.

10. The load characteristic estimating apparatus for the driving machine according to claim 8, wherein the normal-rotation-load calculating unit sets a time constant of a calculation for calculating the sequential average to a value larger than time required by the action command from start to stop, and the reverse-rotation-load calculating unit sets a time constant of a calculation for calculating the sequential average to a value larger than time required by the action command from start to stop.

11. The load characteristic estimating apparatus for the driving machine according to claim 6, further comprising:

a normal-rotation-speed calculating unit configured to calculate a sequential average of the driving speed when the result of the determination of the sign determining unit is the normal rotation action state; and a reverse-rotation-speed calculating unit configured to calculate a sequential average of the driving speed when the result of the determination of the sign determining unit is the reverse rotation action state, wherein the average calculated by the normal-rotation-speed calculating unit is set as the first speed threshold, and the average calculated by the reverse-rotation-speed calculating unit is set as the second speed threshold.

12. The load characteristic estimating apparatus for the driving machine according to claim 6, wherein the divided-section-average calculating unit sets a transfer characteristic of a calculation for calculating the sequential average of the load driving force signal for each of the action sections and a transfer characteristic of a calculation for calculating the sequential average of the driving speed for each of the action sections to the same transfer characteristic.

13. The load characteristic estimating apparatus for the driving machine according to claim 6, wherein the divided-section-average calculating unit sets, based on a result of the determination of the action-section determining unit, a time constant of a calculation for calculating a sequential average of the load driving signal for each of the action sections to a value larger than time required by the action command from start to stop.

\* \* \* \* \*